United States Patent
Murakami

(10) Patent No.: US 6,444,285 B1
(45) Date of Patent: Sep. 3, 2002

(54) ULTRAVIOLET-CURING COMPOSITION, OPTICAL DISK, AND METHOD OF PRODUCING OPTICAL DISK

(75) Inventor: Kazuo Murakami, Kawagoe (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/463,784

(22) PCT Filed: May 26, 1999

(86) PCT No.: PCT/JP99/02757

§ 371 (c)(1),
(2), (4) Date: Jan. 28, 2000

(87) PCT Pub. No.: WO99/61542

PCT Pub. Date: Dec. 2, 1999

(30) Foreign Application Priority Data

May 28, 1998 (JP) ............................................ 10-147400
May 28, 1998 (JP) ............................................ 10-147401

(51) Int. Cl.⁷ .................................................. B32B 3/02
(52) U.S. Cl. ...................... 428/64.1; 428/64.4; 428/65.2
(58) Field of Search ............................... 428/64.1, 64.2, 428/64.4, 65.2, 913; 430/270.11, 495.1, 945; 369/283

(56) References Cited

FOREIGN PATENT DOCUMENTS

| EP | 0 827 974 | 3/1998 |
|---|---|---|
| EP | 0 835 917 | 4/1998 |
| JP | 1 156387 | 6/1989 |
| JP | 5-182242 | 7/1993 |
| JP | 9-7228 | 1/1997 |
| JP | 9-249734 | 9/1997 |
| JP | 10-120982 | 5/1998 |
| WO | WO97/33932 | 9/1997 |
| WO | WO 98/36325 | 8/1998 |

*Primary Examiner*—Elizabeth Evans
(74) *Attorney, Agent, or Firm*—Armstrong, Westerman & Hattori, LLP

(57) ABSTRACT

To obtain a digital video disc having excellent durability in a high temperature and high humidity environment, an ultraviolet curable composition prepared such that water in which the cured coating film has been immersed has a specific conductivity of 100 $\mu$S/cm or less is provided as an adhesive for use in bonding two discs with information recording layers, respectively, having thin films of different kinds of material.

21 Claims, No Drawings

ULTRAVIOLET-CURING COMPOSITION, OPTICAL DISK, AND METHOD OF PRODUCING OPTICAL DISK

TECHNICAL FIELD

The present invention relates to an adhesive used when bonding two discs, at least one of which has an information recording layer, to each other, and more particularly relates to an ultraviolet curable composition.

The present application is based on Japanese Patent Application No. Hei 10-147000 and Japanese Patent Application No. Hei 10-147001, the contents of which are incorporated herein by reference.

BACKGROUND ART

Optical discs having a bonded structure which have hitherto been well known include, for example, magneto optical discs capable of recording and reproducing information. A magneto optical disc has a transparent substrate of polycarbonate, etc., on which an information recording material composed of, for example, a TbFeCo alloy, etc., and provided on both sides thereof with a protective layer composed of silicon nitride, etc., is laminated. An information recording layer is formed by further forming on the outermost layer a thin film mainly composed of aluminum as a reflecting layer for a laser beam for reading information. If needed, a protective layer composed of an ultraviolet curable resin is further formed on the thin film composed mainly of aluminum. In one case, this is used as it is as a single plate, and in another case, the single plates are bonded via an adhesive such that the information recording layers oppose each other, before they are used.

As the adhesive, a hot-melt type adhesive and an adhesive composed of an ultraviolet curable resin are used.

Thus, an optical disc having a conventional bonded structure in which both of the two discs have an information recording layer is of such a structure that "thin films of the same kinds of metal" composed mainly of aluminum oppose each other via an adhesive. Japanese Patent Publications Nos. 2553171 and 2555178 disclose technologies relative to ultraviolet curable adhesives suitable for the optical discs.

A digital video disc or digital versatile disc (DVD), a new type of optical disc having a bonded structure, is produced by a method of bonding two discs of which at least one disc has an information recording layer, and use of an ultraviolet curable composition as an adhesive is being studied.

In the case of read-only DVDs, the structure of the bonded two substrates may be one of the following types or the like, which can be selected properly depending on the application: a type in which polycarbonate substrates are used which are each provided on one surface thereof with irregularities called pits which correspond to information to be recorded and further, as a reflecting film for a laser beam for reading information there, an aluminum layer, for example, is formed, to provide an information recording layer (DVD-10); a type in which one of such substrates is formed with a semitransparent film of gold, silicon nitride or the like to provide an information recording layer (DVD-9); a type in which as one of the substrates a transparent polycarbonate substrate having no information recording layer is used (DVD-5); and a type in which each substrate has two information recording layers composed of a layer of aluminum, etc., and a semitransparent film of gold, silicon nitride or the like, and two such substrates are bonded (DVD-17).

Of these, a DVD-9 disc is of a structure in which "thin films of different kinds of material" such as aluminum and gold or silicon nitride are opposed through an adhesive. When the ultraviolet curable compositions as described in Japanese Patent Publications Nos. 2553171 and 1555178 are used as an adhesive, the durability of the discs is insufficient, and they are very weak in adhesive force to the gold or silicon nitride in the semitransparent film, so that the compositions described in the above patents are poor in serviceability as an adhesive for DVDs.

When gold is used as a semitransparent film for DVD-9, the structure becomes such that "different types of metal" are opposed to each other through an adhesive.

Different metals, when immersed in aqueous solutions, have intrinsic potentials, and the contact of or the electrical connection of metals having different potentials results in formation of a battery, and the metal having a lower potential is corroded. This is well known and the details thereof are described in, for example, "Denki Kagaku Hou (Electrochemical Method) (published by Kodansha)."

The standard electrode potentials of various compounds in aqueous solutions are described in detail in, for example, Denki Kagaku Binran (Manual of Electrochemistry) (ed. Denki Kagaku Kyokai (Electrochemical Association), published by Maruzen Co., Ltd.); for the $Al^{3+}/Al$ reaction on an aluminum electrode, the potential is −1.68 V, and for the $Au^{3+}/Au$ reaction on an aluminum electrode, the potential is +1.50V.

Therefore, for example, when a bonded disc of the DVD-9 type having thin films of aluminum and of gold is placed in a high temperature and high humidity environment, under the condition in which these metal thin films are electrically connected to each other, the corrosion of the aluminum, which has a lower potential, is promoted. This is specific to DVD-9 discs, which have metal thin films of different types. Accordingly, the prior art adhesive for optical discs directed to discs having thin films of the same kinds of metal composed mainly of aluminum has not been designed taking such electrochemical corrosion mechanisms into consideration, so that there has been the problem of insufficient durability when the DVD-9 discs are used without modification.

That is, a problem to be solved by the present invention is to provide an ultraviolet curable composition having excellent durability in DVD-9 discs by making a design capable of inhibiting the phenomenon of corrosion specific to not only the case where a semitransparent film composed of an inorganic compound such as silicon nitride is used but also to the case where a semitransparent film of a metal such as gold is used and to provide an ultraviolet curable composition used as an adhesive for optical discs which can be used advantageously for all the formats including DVD-5, DVD-10, and DVD-17.

DISCLOSURE OF THE INVENTION

The present inventors have carried out intensive study to solve the above problem, and, as a result, have found that when the specific conductivity of pure water in which a cured coating film of an ultraviolet curable composition has been immersed is equivalent to or below a specified value, the durability of the bonded disc increases, and that this effect is particularly remarkable in DVD-9 discs having thin films of different kinds of metal, and thus the present inventors achieved the present invention.

That is, the present invention provides an ultraviolet curable composition for optical discs, the composition containing an ultraviolet curable compound and a photopolymerization initiator and being used when bonding two substrates which have information recording layers, respectively, on each outermost layer of which a thin film of different type of material is formed, wherein the ultraviolet curable composition is characterized in that water in which a cured coating film has been immersed has a specific conductivity of 100 µS/cm or less.

BEST MODE FOR CARRYING OUT THE INVENTION

In optical discs of the present invention, the specific conductivity of water in which a cured coating film, which corresponds to a cured adhesive, has been immersed is defined as follows.

First, about 1 g of a cured coating film is peeled and is weighed exactly to four decimal places.

Then, 100 g of pure water is put in a 250 ml brown polymer bottle, and further the cured coating film weighed as above is added. As the pure water, pure water which is initially adjusted to 18 MΩ•cm is used.

Further, the polymer bottle containing this sample is placed in an oven at 80° C. and taken out after 96 hours, and the specific conductivity (A) of water in which the cured coating film has been immersed is measured at 25±1° C.

The calculations are carried out according to the following:

$$\text{Specific conductivity} = \frac{\text{specific conductivity (A)}}{\text{weight of cured coating film}}$$

Specific conductivity was measured using a CM-50AT conductivity meter manufactured by TOA Electronics, Ltd.

In the case of commercially available optical discs, their specific conductivity can be measured according to the above, and in the case where an ultraviolet curable composition (adhesive) before it is used for bonding is available, the specific conductivity of water in which the cured coating film has been immersed according to the present invention can be measured also by the following procedure.

(1) A glass plate is coated with an ultraviolet curable composition to a film thickness of about 100 µm. As the glass plate, one having no effect on the measurement of specific conductivity is used.

(2) In the case where the ultraviolet irradiation method is by continuous light irradiation, an MO3-L31 (120 W/cm metal halide lamp with a cold mirror) manufactured by EYE GRAPHICS CO., LTD. is used as a UV lamp under a nitrogen atmosphere and irradiation of 500 mJ/cm² (ultraviolet light actinometer: UVPF-36 manufactured by EYE GRAPHICS CO., LTD.) is carried out at a lamp height of 10 cm to prepare a cured coating film.

(3) In the case where the ultraviolet irradiation method is by flash irradiation, a flash irradiation apparatus equipped with 4 lamps is used under a nitrogen atmosphere, which is adjusted such that input energy per shot per lamp is 200 J, and ultraviolet light is irradiated at a frequency of 2 Hz by 10 shots to prepare a cured coating film.

The lamp used here is as follows, and the actual output energy from the lamp for the above input energy is as follows. The emission spectrum of flash irradiation light from the lamp is measured using a spectroradiometer (USR-20A manufactured by Ushio Inc.) and integrated from 300 nm to 390 nm to obtain the ultraviolet light strength and irradiation amount, which are adjusted such that the ultraviolet light strength is 19 W/cm² and the ultraviolet irradiation amount is 12 mJ/cm².

(4) The cured coating film peeled off from the glass plate is reduced in size to about 1 to 2 cm square and about 1 g is weighed exactly to four decimal places.

(5) In a 250 ml brown polymer bottle, 100 g of pure water is added, and further the cured coating film weighed in (4) is added. As the pure water, pure water which is initially adjusted to 18 MΩ•cm is used.

(6) The polymer bottle containing this sample is placed in an oven at 80° C. and taken out after 96 hours and the specific conductivity (A) of water in which the cured coating film has been immersed measured at 25±1° C.

(7) The calculations are carried out according to the following:

$$\text{Specific conductivity of the present invention} = \frac{\text{specific conductivity (A)}}{\text{weight of cured coating film}}$$

(8) The specific conductivity is measured using a CM-50A conductivity meter manufactured by TOA Electronics, Ltd.

The specific conductivity of water in which the cured coating film has been immersed depends on the amount of water-soluble electrolyte components eluted from the cured coating film. Therefore, upon preparation of the composition, it is preferred to select those which contain no (absolutely none) or minimal amounts of components which can be water-soluble electrolyte components, such as reaction catalysts and carboxylic acids represented by (meth) acrylic acid, which remain in polymerizable monomers such as monofunctional (meth)acrylate and polyfunctional (meth) acrylate, or in polymerizable oligomers such as polyester acrylate, polyether acrylate, epoxy acrylate, and urethane acrylate, and various additives added as thermal polymerization inhibitors, antioxidants, etc.

Further, since the photopolymerization initiator decomposates which are generated upon irradiation with ultraviolet light or side reaction products derived from the decomposates can also be electrolyte components, it is preferred that the photopolymerization initiators be selected so that these components occur in small amounts.

The raw materials for preparing the composition of the present invention are purified before use, as needed.

As for the acrylates as described below, it is often the case that upon their synthesis the following catalysts or additives are used for preventing polymerization, and since they act as water-soluble electrolytes which increase the specific conductivity in the present invention, those which have as a small water-soluble electrolyte content as possible are used.

For example, in the case where acrylic acid and an alcohol or alkylene glycol are directly reacted to synthesize polyalkylene glycol polyacrylate, there are used, for example, sulfuric acid, concentrated sulfuric acid, phosphoric acid, etc., so that commercially available products may contain them in relatively large amounts.

It is sometimes the case that commercially available polymerizable monomers and polymerizable oligomers contain hydroxylamine, phenylenediamine used as a polymerization inhibitor in relatively large amounts.

For example, in the case where acrylic acid is reacted with alkylene(ethylene oxide or propylene oxide) to synthesize β-hydroxy ester, there are used, for example, iron compounds such as ferric chloride, chromium compounds such as chromic anhydride, alkali metal compounds such as sodium carbonate, tertiary amines, quaternary ammonium salts, quaternary pyridinium salts, etc., so that commercially available products may contain these in relatively large amounts.

In the case of synthesizing alkyl aminoacrylate by transesterification between methyl acrylate and alkylamino alcohol, there are used, for example, sodium methylate, di-n-butyltin oxide, etc., or parahydroxydiphenylamine, phenothiazine, diethylhydroxyamine, etc., for inhibiting anionic polymerization, so that commercially available products may contain these in relatively large amounts.

In the case where an adduct of an alcohol and ε-caprolactone is used as a raw material upon synthesis of acrylates, the catalyst used upon the addition reaction of ε-caprolactone in many cases is contained as it is as an impurity. In this case, the catalyst contained in the above adduct as a commercially available product includes, for example, organotitanium compounds such as tetraisopropyl titanate and tetrabutyl titanate, tin compounds such as tetraphenyltin, tetraoctyltin, dilauryltin oxide, and di-n-butyltin dichloride.

Further, it is often the case that among the monomers, there are impurities derived from reaction by-products or unreacted components.

Further, it is often the case that the polymerizable monomers and polymerizable oligomers when acrylic acid is used contain unused acrylic acid or polymerisate of acrylic acid. It is often the case that, for benzyl acrylate, an example of acrylates having a benzene ring, its commercially available product produced from sodium acrylate and benzyl chloride contains sodium chloride. It is often the case that when acrylic acid and ethylene oxide are reacted, the resulting ethylene glycol is included. It is often the case that when desalting is carried out in order to separate this, ammonium chloride or the like is included.

Upon preparing the composition of the present invention, each of the polymerizable oligomer and polymerizable monomer constituting the composition used are those which contain as little water-soluble electrolyte components as possible.

The main feature of the present invention is that the composition is adjusted so that the specific conductivity of water in which the cured coating film has been immersed is finally 100 $\mu$S/cm or less. By doing so, even in high temperature and high humidity environments, the above-described contact corrosion of different types of metal can be inhibited so that the durability of DVD-9 discs increases markedly.

The specific conductivity of water in which the cured coating film has been immersed may be 100 $\mu$S/cm or less but is preferably 50 $\mu$S/cm or less since contact corrosion can be more effectively inhibited. That is, the specific conductivity of water in which the cured coating film has been immersed may be 0 to 100 $\mu$S/cm but is preferably 0 to 50 $\mu$S/cm since the contact corrosion can be more sufficiently inhibited.

Upon preparing the ultraviolet curable composition of the present invention, an ultraviolet curable compound and a photopolymerization initiator are used as essential components. As the ultraviolet curable compound, monofunctional (meth)acrylate and polyfunctional (meth)acrylate can be used as a polymerizable monomer component. These may be used singly or two or more of them may be used in combination. In the present invention, acrylate and methacrylate together are called (meth)acrylate and similarly, acrylic acid and methacrylic acid together are called (meth) acrylic acid.

In the present invention, taking into consideration the physical properties of the cured coating film, the necessary polymerizable monomers and polymerizable oligomers are selected from those below and combined to prepare the composition of the present invention. It is satisfactory if each of the polymerizable monomers and polymerizable oligomers selected for the preparation of the composition is in the above specific conductivity range but the composition is adjusted such that the composition as a whole is in the above specific conductivity range.

The polymerizable monomer which can be used in the present invention includes, for example, the following.

The monofunctional (meth)acrylate includes, for example, (meth)acrylate and the like, having a group such as methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, tetrahydrofurfuryl, glycidyl, 2-hydroxyethyl, 2-hydroxypropyl, 3-chloro-2-hydroxypropyl, dimethylaminoethyl, diethylaminoethyl, nonylphenoxyethyltetrahydrofurfuryl, caprolactone-modified tetrahydrofurfuryl, isobornyl, dicyclopentanyl, dicyclopentenyl, dicyclopentenyloxyethyl or a similar group as a substituent group.

Also, the polyfunctional (meth)acrylate includes, for example, diacrylates of 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecanedimethanol, ethylene glycol, polyethylene glycol, propylene glycol, tripropylene glycol, polypropylene glycol, etc., di(meth)acrylate of tris(2-hydroxyethyl) isocyanurate, di(meth)acrylate of a diol obtained by adding 4 moles or more of ethylene oxide or propylene oxide to 1 mole of neopentyl glycol, di(meth)acrylate of a diol obtained by adding 2 moles of ethylene oxide or propylene oxide to 1 mole of bisphenol A, di- or tri(meth)acrylate of a triol obtained by adding 3 moles or more of ethylene oxide or propylene oxide to 1 more of trimethylolpropane, di(meth)acrylate of a diol obtained by adding 4 moles or more of ethylene oxide or propylene oxide to 1 more of bisphenol A, tris(2-hydroxyethyl) isocyanurate tri(meth)acrylate, trimethylolpropane tri(meth)acrylate, pentaerythritol tri(meth)acrylate, dipentaerythritol poly(meth)acrylate, caprolactone-modified tris[(meth)acryloxyethyl] isocyanurate, alkyl-modified dipentaerythritol poly(meth) acrylate, caprolactone-modified dipentaerythritol poly (meth)acrylate, hydroxypivaric acid neopentyl glycol diacrylate, caprolactone-modified hydroxypivalic acid neopentyl glycol diacrylate, ethylene oxide-modified phosphoric acid (meth)acrylate, ethylene oxide-modified alkylated phosphoric acid (meth)acrylate, etc.

Also, N-vinyl-2-pyrrolidone, acryloylmorpholine, vinylimidazole, N-vinylcaprolactam, N-vinylformamide, vinyl acetate, (meth)acrylic acid, (meth)acrylamide, N-hydroxymethylacrylamide, or N-hydroxyethylacrylamide, and alkyl ether compounds thereof, etc., can also be used.

Further, those which can be used in combination similarly to the polymerizable monomer include as polymerizable oligomers, polyester (meth)acrylate, polyether (meth) acrylate, epoxy (meth)acrylate, urethane (meth)acrylate, etc.

In the present invention, the photopolymerization initiator may be any publicly known, commonly used one with which ultraviolet curable compounds represented by the polymerizable monomers and/or polymerizable oligomers used can be cured. As the photopolymerization initiator, those which have a molecular extinction coefficient of 50 (1/mol•cm) or more at 370 to 450 nm, for example, and molecule cleaving type or hydrogen eliminating type ones that do not belong thereto are suitable for the present invention. Use of these in combination is more suitable.

Of the photopolymerization initiators used in the present invention, those having a molecular extinction coefficient of 50 (l/mol•cm) or more at 370 to 450 nm, for example, include benzoin isobutyl ether, 2,4-diethylthioxanthone, 2-isopropylthioxanthone, 2-chlorothioxanthone, benzil, 2,4,6-trimethylbenzoyldiphenylphosphine oxide, 2-benzyl-2-dimethylamino-1-(4-morpholinophenyl)butanone-1, bis(2,6-dimethoxybenzoyl)-2,4,4-trimethylpentylphosphine oxide, etc., and further, as molecule cleaving type ones other than these, 1-hydroxycyclohexyl phenyl ketone, benzoyl ethyl ether, benzyl dimethyl ketal, 2-hydroxy-2-methyl-1-phenyl-propan-1-one, 1-(4-isopropylphenyl)-2-hydroxy-2-methylpropan-1-one and 2-methyl-1-(4-methylthiophenyl)-2-morpholino-propan-1-one, etc., may be used in combination. Further, benzophenone, 4-phenylbenzophenone, isophthalophenone, 4-benzoyl-4'-methyl-diphenyl sulfide, etc., which are hydrogen eliminating type photopolymerization initiators, may be used in combination. As the molecule cleaving type photopolymerization initiator used in combination with one having a molecular extinction coefficient of 50 (l/mol•cm) or more at 370 to 450 nm is preferred 1-hydroxycyclohexyl phenyl ketone with respect to curability and the durability of bonded discs.

In combination with the above photopolymerization initiator can be used, as a sensitizer, amines that do not undergo addition polymerization reaction with the above-described polymerizable components, such as, for example, triethylamine, methyldiethanolamine, triethanolamine, p-diethylaminoacetophenone, p-dimethylaminoacetophenone, ethyl p-dimethylaminobenzoate, isoamyl p-dimethylaminobenzoate, N,N-dimethylbenzylamine, and 4,4'-bis(diethylamino)benzophenone. Of course, it is preferred to select for use the above-described photopolymerization initiators and sensitizers from those which are excellent in solubility in the curable components and which do not interfere with ultraviolet light transmission.

It is preferred to use ultraviolet curable compositions which are liquid at room temperature to 40° C. It is preferred not to use solvents. If used, it is preferred to limit the amount to a level as small as possible. In the case where coating of the above-described composition is done using a spin coater, it is preferred to adjust the viscosity to 20 to 1,000 mPa•s and in the case where a relatively thick film is to be obtained, it may be adjusted to 100 to 1,000 mPa•s.

To the composition of the present invention may if necessary be blended as still other additives thermal polymerization inhibitors, antioxidants represented by hindered phenols, hindered amines, phosphites, etc., plasticizers, silane coupling agents represented by epoxysilane, mercaptosilane, (meth)acrylsilane, etc., and the like in order to improve various properties. These are selected for use from those which are excellent in solubility in curable components, which do not interfere with ultraviolet transmission, and which contain no or minimized amounts, if any, of water-soluble electrolyte components.

Upon preparing the composition of the present invention, the chemical composition is appropriately selected such that the physical properties of not only the above-described photopolymerization initiator but also of the composition itself and the physical properties of curable bonding layer are suitable for a DVD.

Since two substrates are bonded in the case of a DVD, if it is dropped by mistake, the substrate may be cracked or peeled off from the adhesion surface. To prevent this, it is preferred that the composition of the present invention be prepared such that the modulus of elasticity of the cured coating film is 1 to 1,000 MPa, preferably 1 to 500 MPa at 30° C.

As for the ultraviolet curable composition of the present invention, it is preferred that not only the specific conductivity of water in which the cured coating film has been immersed be set in a specified range but also that the water absorption of cured coating film be set to 1 to 7 wt %. If the water absorption is below 1 wt %, then after removing the disc from a high temperature and high humidity tester, bubbles readily occur between the adhesive cured coating film and the disc surface contacting the cured coating film so that deformation occurs in the signal layer or adhesive cured film, tending to lead to an increase in error in reading recorded information. Water absorption exceeding 7 wt % is not preferable since pin-holes tend to be formed in the thin film of a metal, such as, for example, aluminum.

In this case, the water absorption of the cured coating film can be measured as follows.

First, according to (1) to (3) of the measurement of specific conductivity of water in which the cured coating film has been immersed, a cured coating film is prepared similarly and the water absorption of the cured coating film is measured according to the method B of JIS K7209-1.

The ultraviolet curable composition thus adjusted is used, in the present invention, when bonding two substrates each having an information recording layer thereon, on which thin films of different kinds of material are formed. In the present invention, two substrates, on each of which an information recording layer is laminated which contains a thin film of a metal or inorganic compound, are opposed to each other and integrated to achieve adhesion. The excellent technical effect of the present invention is exhibited particularly remarkably when the respective metals or inorganic compounds constituting the two thin films to be bonded to each other are a combination of different kinds of material which generate a difference in potential in a standard electrode potential.

In the present invention, a substrate to be bonded to another has an information recording layer including a thin film layer provided by forming a thin film, and the entirety of a portion obtained therefrom by excluding the substrate itself is called an information recording layer. The outermost layer of the information recording layer means the following light reflecting layer and semitransparent film. As the substrate, a heat resistant thermoplastic resin transparent substrate is typical.

In these two heat resistant thermoplastic resin transparent substrates which are to be bonded, on which information recording layers are laminated, respectively, including thin films as the outermost layers included in the respective information recording layers, that is, the light reflecting layer and the semitransparent film, the metals constituting such layers include, for example, aluminum and metals composed mainly of aluminum, and gold and the inorganic compounds constituting such layers include, for example, silicon based inorganic compounds such as silicon nitride, silicon carbide or silicon. The combination of different kinds of material that will cause a difference in potential in the standard electrode potential includes, for example, a combination of a metal composed mainly of aluminum-gold (light reflecting film-semitransparent film). The light reflecting film is not particularly limited in its material if it has a reflectivity of 45% or more for a laser beam for reading information while the semitransparent film is not particularly limited in its material if it has a reflectivity of 18% or more for a laser beam for reading information. At any rate, in the combination of different kinds of material that will cause a difference in potential in the standard electrode potential, the effect of the present invention is exhibited remarkably.

When each piece to be bonded is viewed from the transparent substrate side (that is, when the transparent substrate is the innermost layer), the light reflecting film and semitransparent film in the information recording layers are the outermost layers in the entire information recording layers. The outermost layers are bonded together by curing with the ultraviolet curable composition so that they contact each other directly, with the interlayer space between the light reflecting film and the semitransparent film being directly joined by the cured film of the composition.

In short, using the two substrates comprising information recording layers, on each outermost layer of which the thin film of different type of material is formed, the ultraviolet curable composition according to the present invention is provided between the thin films; they are arranged to oppose each other; they are bonded together; and thereafter, ultraviolet light is irradiated through either one thin film or both the thin films to convert the composition to a cured coating film to integrate both substrates with each other.

Thus obtained is an optical disc having at least a bonded structure comprising two substrates having information recording layers, respectively, on each outermost layer of which a thin film of different type of material is formed, the thin films in the respective substrates being bonded to each other through a cured coating film of an ultraviolet curable composition containing an ultraviolet curable compound and a photopolymerization initiator, wherein water in which the cured coating film has been immersed has a specific conductivity of 100 $\mu$S/cm or less.

In the present invention, as described above, the thin films as outermost layers of the exposed information recording layers may be bonded directly or as the case may be, protective coat layers for protecting the thin films may be provided and the protective coat layers may be bonded to each other. In this case, the protective coat layers are formed usually from a cured product of an ultraviolet curable composition containing an ultraviolet curable compound and a photopolymerization initiator. In this case, the protective coat layers must be transparent to ultraviolet light. The ultraviolet curable composition for the protective coat layers is preferably prepared so that it is excellent in adhesion to both the outermost exposed layer of the information recording layer and the cured product of the ultraviolet curable composition. Even in the case where the substrates provided with a protective coat layer on the outermost layer of the information recording layer are bonded, the protective coat layer is in a water-absorbed state under high temperature and high humidity environment and hence the water-soluble electrolyte components in the adhesive cured coating film can transmit through the protective coat layer. Therefore, even when the composition of the present invention is not in contact with the outermost layer of information recording layer directly, the effect of using the composition of the present invention is exhibited so that a DVD-9 disc which is excellent in durability can be obtained.

The optical disc provided with the above-described protective coat layer can be obtained by providing the ultraviolet curable composition of the present invention on at least one or both of thin films each of which is formed on one of the two substrates comprising information recording layers, on each outermost layer of which the thin film of different type of material is formed; irradiating ultraviolet light onto the composition to provide a protective coat layer composed of a cured coating film of the ultraviolet curable composition; then providing an ultraviolet curable composition, which may or may not be of the type according to the present invention, containing an ultraviolet curable compound and a photopolymerization initiator between the protective coat layer of one substrate and the thin film of the other substrate opposing each other, or between the protective coat layers of both substrates opposing each other; bonding them together; and irradiating ultraviolet light through either one of or both of the thin films to convert the composition into a cured coating film to integrate both substrates with each other.

The optical disc provided with the above-described protective coat layer may be of two types in layer construction.

(1) An optical disc having at least a bonded structure comprising two substrates having information recording layers, respectively, on each outermost layer of which a thin film of different type of material is formed, on one of the thin films a protective coat layer composed of a cured coating film which transmits to ultraviolet light being provided, the coating film being obtained from an ultraviolet curable composition containing an ultraviolet curable compound and a photopolymerization initiator, the protective coat layer of one of the substrates and the thin film of the other of the substrates being bonded together by the cured coating film of the ultraviolet curable composition containing an ultraviolet curable compound and a photopolymerization initiator, wherein the optical disc is characterized in that a water in which the cured coating film of the protective coat layer has been immersed has a specific conductivity of 100 $\mu$S/cm or less.

(2) An optical disc having at least a bonded structure comprising two substrates having information recording layers, respectively, on each outermost layer of which a thin film of different type of material is formed, on each of the thin films a protective coat layer composed of a cured coating film which transmits to ultraviolet light being provided, the coating film being obtained from an ultraviolet curable composition containing an ultraviolet curable compound and a photopolymerization initiator, the protective coat layers of the both substrates being bonded together by the cured coating film of the ultraviolet curable composition containing an ultraviolet curable compound and a photopolymerization initiator, wherein the optical disc is characterized in that water in which the cured coating film of the protective coat layer has been immersed has a specific conductivity of 100 $\mu$S/cm or less.

In this case, it is preferred to use the above-described composition of the present invention in bonding a protective coat layer and a thin film or in bonding a protective coat layer and a protective coat layer.

The technical effect of the present invention is exhibited not only in a DVD-9 disc having the above-described layer structure but also in a DVD-17 disc corresponding to a layer structure in which two of the DVD-9 discs are bonded to each other.

As the optical discs having at least a structure comprising two substrates having information recording layers, respectively, on each outermost layer of which a thin film of different type of material is formed, the thin films on the two substrates being bonded together by the cured coating film of the ultraviolet curable composition containing an ultraviolet curable compound and a photopolymerization initiator, there are optical discs having a set of thin films of different types of material (two sheets of thin film) and optical discs having two sets of thin films of different types of material (four sheets of thin film), regardless of whether or not the protective coat layer is present. The optical disc having a set of the thin films of different kinds of material is a DVD-9 disc.

The optical disc in the case where there are two sets of thin films of different kinds of material corresponds to DVD-17. The optical disc in the case where there are two sets of thin films of different kinds of material can be obtained by bonding two optical discs each having one set of the thin films of different kinds of material such that for both discs, the thin film having a higher ultraviolet transmittance of the two thin films in each disc is arranged on the outer side.

The composition of the present invention can be also used for DVD-RAMs of the rewritable type or DVD-R of the writable type.

As the heat resistant thermoplastic transparent resin substrate, there can be used, for example, polycarbonate, polymethyl methacrylate, amorphous polyolefins, etc.

In the present invention, two heat resistant thermoplastic transparent resin substrates, on each of which an information recording layer is laminated, are bonded to integrate them such that their respective thin film sides are opposed to each other, by irradiating ultraviolet light through either one thin film or both the thin films toward the composition of the present invention to cure it. The irradiation of ultraviolet light is preferably performed from the side of the thin film having a higher ultraviolet transmittance if the irradiation with ultraviolet light is performed only to either one of the thin films.

The optical discs having the protective coat layer as in (1) to (2) described above can be obtained by providing an ultraviolet curable composition containing an ultraviolet curable compound and a photopolymerization initiator, such that water in which an ultraviolet transmitting cured coating film has been immersed has a specific conductivity of 100 $\mu$S/cm or less, between thin films on two substrates comprising information recording layers, on each outermost layer of which the thin film of different type of material is formed; irradiating ultraviolet light onto the composition to provide a protective coat layer composed of a cured coating film of the ultraviolet curable composition; then providing an ultraviolet curable composition containing an ultraviolet curable compound and a photopolymerization initiator between the protective coat layer of one substrate and the thin film of the other substrate opposing each other, or between the protective coat layers of both substrates opposing each other; bonding them together; and irradiating ultraviolet light through either one of or both of the thin films to convert the composition into a cured coating film to integrate both substrates with each other.

Upon curing the composition of present invention with ultraviolet light, as the continuous light irradiation system which is publicly known, a commonly used system can be used, for example, metal halide lamp, high pressure mercury lamp, etc.

However, a flash irradiation system is more preferred in that the ultraviolet curable composition can be cured sufficiently with a smaller amount of energy than the conventional continuous light irradiation system and that by using the composition having the same chemical composition, the specific conductivity of water in which the cured coating film has been immersed can be made lower (In the present invention, this irradiatoin system is referred to as flash ultraviolet irradiation system).

In the present invention, the flash irradiation of ultraviolet light is performed so that one flash is completed in a very short time on the order of from microseconds to milliseconds. To fabricate one bonded disc, the flash occurs once, or is repeated, and preferably flash irradiation is carried out 3 to 15 times.

In flash ultraviolet irradiation, there can be used publicly known, commonly used ultraviolet light sources, for example, metal halide lamps, high pressure mercury lamps, xenon lamps, xenon-mercury lamsp, etc. Examples of lamps having sufficient durability to endure repeated emission of flashes carried out in the present invention include a xenon lamp.

Since use of the above-described ultraviolet light source as it is results in the emitted ultraviolet light being a continuous light (i.e., the system is a continuous light irradiation system), a flashing light emission apparatus is formed by combining it with a discharging mechanism for flash irradiation to enable flash ultraviolet irradiation. As the flash discharging mechanism, there can be used, for example, a circuit having serially connected a capacitor for condensing the charge, a coil for controlling the current waveform upon discharging, the above-described light source and an electrode.

By conducting flash ultraviolet irradiation on the composition of the present invention by using a combination of the ultraviolet light source and flash discharging mechanism, bonding by curing can be performed with a reduced power consumption and in a shorter irradiation time as compared with those required for bonding by curing using the above-described continuous light irradiation system, while suppressing curling to a very low level without damaging the information recording layer.

Upon conducting flash ultraviolet irradiation, it is preferred that an infrared light blocking filter be provided between the above-described substrate and the ultraviolet light source so that the composition in an uncured state between the thin films can be bonded by curing while blocking the infrared light in order to obtain a final product DVD disc with less curl.

Besides DVD, there have been conventionally, for example, a magneto optical disc (MO) having one recording film of a laminate structure for one-sided recording, such as polycarbonate/silicon nitride/TbFeCo (recording layer) /silicon nitride/aluminum reflecting layer/protective layer for an ultraviolet curable resin film and a magneto optical disc having two recording films for double-sided recording of a laminate structure such as polycarbonate/silicon nitride/ TbFeCo (recording film)/silicon nitride/aluminum reflecting layer/ultraviolet curable adhesive/aluminum reflecting layer/silicon nitride/TbFeCo (recording film) /silicon nitride/polycarbonate.

However, in the former, in the interlayer space between the layers of different kinds of metal or inorganic compounds there is no ultraviolet curable resin, and in the latter the ultraviolet curable adhesive in contact with the same metal (aluminum) and sandwiched thereby. Therefore, in either case, there is no possibility that the standard electrode potentials are differentiated Therefore, the effect of the present invention is particularly remarkable, and cannot be expected by merely applying to DVD-9 an ultraviolet curable protective coating agent for a light reflecting film for a conventional one sided recording MO or an ultraviolet curable adhesive for a light reflecting film in a double-sided recording MO.

The effect of the present invention is expected when the layer is in direct contact with different kinds of material has the specific conductivity of the immersion water within a specified range, regardless of whether the layer is based on a hot-melt adhesive or based on a cured product (cured film) of an ultraviolet curable composition. The present invention, which uses an ultraviolet curable composition as an adhesive, clearly has superior effects in that the present invention can satisfy the requirements in properties specific to DVDs such as the requirement of small curling even if thermal hysteresis is present at the time in the bonding or after the bonding, and that it can further increase the productivity of bonding per unit hour.

EMBODIMENTS OF THE INVENTION

Embodiments of the present invention will be described in detail based on preferred embodiments of the present invention.

First, one disc-like plastic substrate in which a 40–60 nm metal thin film is laminated on irregularities called pits, corresponding to the recorded information, and one disc-like plastic substrate in which a 10–30 nm semitransparent thin film of gold is laminated on irregularities called pits, corresponding to the recorded information, are prepared.

Then, an ultraviolet curable composition is prepared such that water in which the cured coating film has been immersed has a specific conductivity of 100 $\mu$S/cm or less and the water absorption of the cured coating film is 1 to 7 wt %, using two kinds or more of polyfunctional (meth) acrylate having two or more (meth)acryloyl groups as a polymerizable monomer or polymerizable oligomer, and optionally a monofunctional monomer, as needed, and further using photopolymerization initiators in an amount of 2 to 7 parts by weight per 100 parts by weight of the liquid ultraviolet curable composition, one of the photopolymerization initiators having an absorption wavelength in the region of 370 nm or higher and having a molecular extinction coefficient of 50 (l/mol.cm) or higher in a wavelength region of 370 nm to 450 nm, and another photopolymerization initiator being of a molecule cleaving type or a hydrogen eliminating type, which is not encompassed by the range of the former photopolymerization initiator.

The above-described composition is coated on the metal thin film surface of a 40–60 nm metal thin film-laminated disc-like plastic substrate and a 10–30 nm gold semitransparent film-laminated disc-like plastic substrate is bonded such that the semitransparent film surface is opposed to the metal thin film surface. Ultraviolet light is irradiated from one side or both sides of the bonded disc to unite the two to form a DVD-9 disc.

EXAMPLES

Next, the present invention will be described in detail by examples. However, the present invention is not limited to these examples. In the examples, "parts" indicates "parts by weight."

Example 1

Twenty six (26) parts of urethane acrylate obtained by reacting 1 mole of polytetramethylene glycol (molecular weight 850) and 2 moles of isophorone diisocyanate, and then with 2 moles of hydroxyethyl acrylate, 24 parts of 2-hydroxy-3-phenoxypropyl acrylate, 17 parts of UNIDICK V-5500 (manufactured by DAINIPPON INK AND CHEMICALS, INC.) as bisphenol A type epoxyacrylate, 20 parts of ethyl carbitol acrylate, 1.5 parts of ethylene oxide-modified trimethylolpropane triacrylate, 0.2 part of ethylene oxide-modified phosphoric acid methacrylate, 0.3 part of ethyl dimethylaminobenzoate, 5 parts of 2-hydroxypropyl acrylate, 2 parts of 2,4,6-trimethylbenzoyldiphenylphosphine oxide as a photopolymerization initiator, and 4 parts of 1-hydroxycyclophenyl ketone were mixed and dissolved at 0° C. for 1 hour to prepare a pale yellow transparent ultraviolet curable composition. Using this composition, the durability of a DVD-9 bonded disc, the specific conductivity of water in which the cured coating film has been immersed, and the water absorption of the cured coating film were evaluated by the following Test Methods 1, 2 and 3, respectively. The results are shown in Table 1.

Example 2

Fifteen (15) parts of urethane acrylate obtained by reacting 1 mole of polytetramethylene glycol (molecular weight 850) and 2 moles of isophorone diisocyanate, and then with 2 moles of hydroxyethyl acrylate, 22 parts of 2-hydroxy-3-phenoxypropyl acrylate, 20 parts of UNIDICK V-5500 (manufactured by DAINIPPON INK AND CHEMICALS, INC.) as bisphenol A type epoxyacrylate, 12 parts of trimethylolpropane triacrylate, 5 parts of tripropylene glycol diacrylate, 17 parts of tetrahydrofurfuryl acrylate, 1.5 parts of ethylene oxide-modified trimethylolpropane triacrylate, 0.2 part of ethylene oxide-modified phosphoric acid methacrylate, 0.3 part of ethyl dimethylaminobenzoate, 2 parts of 2-hydroxypropyl acrylate, 2 parts of 2,4,6-trimethylbenzoyldiphenylphosphine oxide as a photopolymerization initiator, and 4 parts of 1-hydroxycyclophenyl ketone were mixed and dissolved at 60° C. for 1 hour to prepare a pale yellow transparent ultraviolet curable composition. Using this composition, the durability of a DVD-9 bonded disc, the specific conductivity of water in which the cured coating film has been immersed, and the water absorption of the cured coating film were evaluated by the following Test Methods 1, 2 and 3, respectively. The results are shown in Table 1.

Comparative Example 1

Twenty two (22) parts of urethane acrylate obtained by reacting 1 mole of polytetramethylene glycol (molecular weight 850) and 2 moles of isophorone diisocyanate, and then with 2 moles of hydroxyethyl acrylate, 23 parts of 2-hydroxy-3-phenoxypropyl acrylate, 20 parts of DICK-LIGHT UE-8200 (manufactured by DAINIPPON INK AND CHEMICALS, INC.) as bisphenol A type epoxyacrylate, 23 parts of ethyl carbitol acrylate, 4.5 parts of ethylene oxide-modified trimethylolpropane triacrylate, 0.2 part of ethylene oxide-modified phosphoric acid methacrylate, 0.3 part of ethyl dimethylaminobenzoate, 1 part of hydroxyethyl methacrylate, 2 parts of 2,4,6-trimethylbenzoyldiphenylphosphine oxide as a photopolymerization initiator, and 4 parts of benzyl dimethyl ketal were mixed and dissolved at 60° C. for 1 hour to prepare a pale yellow transparent ultraviolet curable composition. Using this composition, the durability of a DVD-9 bonded disc, the specific conductivity of water in which the cured coating film has been immersed, and the water absorption of the cured coating film were evaluated by the following Test Methods 1, 2 and 3, respectively. The results are shown in Table 1.

<Test Method 1: Durability Test on DVD-9 Bonded Disc>

On a polycarbonate disc on which pits for recording information is formed and aluminum is laminated to 50 nm, the above-described composition was coated with a dispenser, and this polycarbonate disc was overlaid with a polycarbonate disc on which gold is laminated to 15 nm as a semitransparent film. Then using a spin coater, the discs were rotated at 1,500 rpm for 5 to 6 seconds so that the film thickness of the cured coating film became about 50–60 μm. Then, using an ultraviolet irradiation apparatus of a belt-conveyor type equipped with a 120 W/cm metal halide lamp (EYE GRAPHICS CO., LTD. M03-L31, with a cold mirror) adjusted at a lamp height of 10 cm, irradiation of 1,000 mJ/cm$^2$ was made in air from the side of the substrate with the gold semitransparent film to make a DVD-9 type bonded disc. On this occasion, the amount of irradiation irradiated to the adhesive transmitted through the substrate with the gold semitransparent film was 500 mJ/cm$^2$. The ultraviolet actinometer used was a UV Meter (UVPF-36) manufactured by EYE GRAPHICS CO., LTD.

Durability tests were conducted in which the bonded disc was left in a high temperature and high humidity environment of 80° C. and 95% RH for 96 hours and 300 hours, respectively, and evaluation of the signal properties before and after the durability test were performed. The durabilities obtained were compared by the ratios of error rates before and after the test (after the durability test/before the durability test). The results are shown in Table 1. If there is no change in the error rate, this value is 1. Larger values indicate worse durability of the bonded disc.

<Test Method 2: Measurement of Specific Conductivity of Water in Which Cured Coating Film Has Been Immersed>

The specific conductivity was measured by the above-described procedure. As a reference, a polymer bottle was provided in which only pure water was charged and measured initially and after the test. As a result, the initial value was 1.4 μS/cm and after the test it was 1.6 μS/cm, so that no effect from the container was observed.

<Test Method 3: Measurement of Water Absorption of Cured Coating Film>

The ultraviolet curable composition was coated on a glass plate to a film thickness of about 100 μm.

Then, under a nitrogen atmosphere, using as a UV lamp an M03-L31 (120 W/cm metal halide lamp, with a cold mirror) manufactured by EYE GRAPHICS CO., LTD., irradiation of 500 mJ/cm$^2$ (an ultraviolet actinometer: UVPF-36, manufactured by EYE GRAPHICS CO., LTD.) at a lamp height of 10 cm was carried out to prepare a cured coating film. The water absorption of the cured coating film was measured according to the Method B of JIS K7209-1984.

Example 3

Using the same composition as in Example 1, the durability of a DVD-9 bonded disc, the specific conductivity of water in which the cured coating film has been immersed, and the water absorption of the cured coating film were evaluated by the following Test Methods 4, 5 and 6, respectively. The results are shown in Table 1.

Example 4

Using the same composition as in Example 2, the durability of a DVD-9 bonded disc, the specific conductivity of water in which the cured coating film has been immersed, and the water absorption of the cured coating film were evaluated by the following Test Methods 4, 5 and 6, respectively. The results are shown in Table 1.

Comparative Example 2

Using the same composition as in Comparative Example 1, the durability of a DVD-9 bonded disc, the specific conductivity of water in which the cured coating film has been immersed, and the water absorption of the cured coating film were evaluated by the following Test Methods 4, 5 and 6, respectively. The results are shown in Table 1.

<Test Method 4: Durability Test on DVD-9 Bonded Disc>

On a polycarbonate disc on which pits for recording information is formed and aluminum is laminated to 50 nm, the above-described composition was coated with a dispenser, and this polycarbonate disc was overlaid with a polycarbonate disc on which gold is laminated to 15 nm as a semitransparent film. Then using a spin coater, the discs were rotated at 1,500 rpm for 5 to 6 seconds so that the film thickness of the cured coating film became about 50 to 60 μm. Then, using a flash irradiation apparatus equipped with 4 lamps, adjusted such that the input energy per shot per lamp is 200 J, ultraviolet light was irradiated at a frequency of 2 Hz by 10 shots form the side of the substrate with the gold semitransparent film to prepare a DVD-9 bonded disc. The emission spectrum of flash irradiation light from the lamp was measured using a spectroradiometer (USR-20A manufactured by Ushio Inc.) and integrated from 300 nm to 390 nm to obtain the ultraviolet light strength and irradiation amount, which were adjusted such that the ultraviolet light strength was 19 W/cm$^2$ and the ultraviolet irradiation amount was 12 mJ/cm$^2$ with the sum of 10 shots being 120 mJ/cm$^2$.

Durability tests were conducted in which the bonded disc was left in a high temperature and high humidity environment of 80° C. and 95% RH for 96 hours and 300 hours, respectively, and evaluation of the signal properties before and after the durability test were performed. The durabilities obtained were compared by the ratios of error rates before and after the test (after the durability test/before the durability test). The results are shown in Table 1. If there is no change in the error rate, this value is 1. Larger values indicate worse durability of the bonded disc.

<Test Method 5: Measurement of Specific Conductivity of Water in Which Cured Coating Film Has Been Immersed>

The specific conductivity was measured by the above-described procedure. As a reference, a polymer bottle was provided in which only pure water was charged and measured initially and after the test. As a result, the initial value was 1.4 μS/cm and after the test it was 1.6 μS/cm, so that no effect from the container was observed.

<Test Method 6: Measurement of Water Absorption of Cured Coating Film>

The ultraviolet curable composition was coated on a glass plate to a film thickness of about 100 μm.

Then, under a nitrogen atmosphere, using a flash irradiation apparatus, adjusted such that input energy per shot per lamp was 200 J, ultraviolet light was irradiated at a frequency of 2 Hz by 10 shots from the side of the substrate with the gold semitransparent film to prepare a cured coating film. The water absorption of the cured coating film was measured according to the Method B of JIS K7209-1984.

TABLE 1

|  | Example 1 Continuous light | Example 2 Continuous light | Example 3 Flash | Example 4 Flash | Comparative Example 1 Continuous light | Comparative Example 2 Flash |
|---|---|---|---|---|---|---|
| Specific conductivity of water in which cured coating film has been immersed ($\mu$S/cm) | 79 | 62 | 46 | 35 | 163 | 115 |
| Water absorption of cured coating film (wt %) | 1.8 | 1.5 | 1.9 | 2.0 | 1.6 | 1.6 |
| DVD-9 Durability (Error rate increase rate) 80°C. 95% RH |  |  |  |  |  |  |
| 96 H | 9 | 4 | 5 | 3 | 200 | 190 |
| 300 H | 25 | 20 | 9 | 5 | Impossible to measure | Impossible to measure |

The measurement of the specific conductivity of water in which the cured coating film has been immersed was performed by forming a cured coating film of composed of cured product of the composition of the present invention on a glass plate and conducting the measurement using this and showing the results obtained. The results were equivalent to the measured values of specific conductivity obtained by conducting measurement similarly after peeling the cured coating film between the different kinds of material form the actually bonded optical disc.

For the compositions of Examples 1 to 4, water in which the cured coating film has been immersed had a specific conductivity of 100 $\mu$S/cm or less, and as a result of durability tests on DVD-9 types bonded discs using a gold semitransparent film, each example showed substantially no change in signal properties and exhibited excellent durability (in the case of 96 hours). Further, Example 3 and Example 4 showing 50 $\mu$S/cm or less showed substantially no change in signal properties after 300 hours.

A DVD-9 disc using the composition of the present invention, when left at room temperature after a high temperature and high humidity test at 80° C. and 95% RH 96H, generated no bubbles and caused no reproduction failure on a player.

INDUSTRIAL APPLICABILITY

The composition of the present invention contains no or minimal amounts of components which can be water-soluble electrolyte components in its cured coating film and as a result water in which the cured coating film has been immersed has a specific conductivity lower than conventional compositions, so that its use enables production of DVD-9 discs which are excellent in disc durability and are highly reliable.

What is claimed is:

1. An ultraviolet curable composition for optical discs, the composition containing an ultraviolet curable compound and a photopolymerization initiator and being used when bonding two substrates which have information recording layers, respectively, on each outermost layer of which a thin film of different type of material is formed, wherein the ultraviolet curable composition is characterized in that water in which a cured coating film has been immersed has a specific conductivity of 100 $\mu$S/cm or less.

2. An ultraviolet curable composition for optical discs, the composition containing an ultraviolet curable compound and a photopolymerization initiator and being used as a protective coat for protecting at least one thin film of two substrates which have information recording layers, respectively, on each outermost layer of which a thin film of different type of material is formed, wherein the ultraviolet curable composition is characterized in that water in which a cured coating film has been immersed has a specific conductivity of 100 $\mu$S/cm or less.

3. The composition as claimed in claim 1, wherein the water absorption of the cured coating film is 1 to 7 wt %.

4. The composition as claimed in claim 1, wherein as the ultraviolet curable compound is used a polyfunctional (meth)acrylate having two or more (meth)acryloyl groups.

5. The composition as claimed in claim 4, wherein as the photopolymerization initiator is used 1-hydroxycyclohexyl phenyl ketone.

6. The composition as claimed in claim 1, 3, 4, or 5, wherein the water in which the cured coating film has been immersed has a specific conductivity of 50 $\mu$S/cm or less.

7. The composition as claimed in claim 1, 3, 4, or 5, wherein the combination of different kinds of material is a combination of a metal composed mainly of aluminum and gold.

8. The composition as claimed in claim 1, 3, 4, or 5, wherein the combination of different kinds of material is a combination of a metal composed mainly of aluminum and a silicon based inorganic compound.

9. An optical disc having at least a bonded structure comprising two substrates having information recording layers, respectively, on each outermost layer of which a thin film of different type of material is formed, the thin films in the respective substrates being bonded to each other through a cured coating film of an ultraviolet curable composition containing an ultraviolet curable compound and a photopolymerization initiator, wherein the optical disc is characterized in that water in which the cured coating film has been immersed has a specific conductivity of 100 $\mu$S/cm or less.

10. An optical disc having at least a bonded structure comprising two substrates having information recording layers, respectively, on each outermost layer of which a thin film of different type of material is formed, on one or each of the thin films a protective coat layer composed of a cured coating film which transmits to ultraviolet light being provided, the coating film being obtained from an ultraviolet curable composition containing an ultraviolet curable compound and a photopolymerization initiator, the protective coat layer of one of the substrates and the thin film of the other of the substrates, or the protective coat layers of both substrates, being bonded together by the cured coating film of the ultraviolet curable composition containing an ultraviolet curable compound and a photopolymerization initiator, wherein the optical disc is characterized in that water in which the cured coating film of the protective coat layer has been immersed has a specific conductivity of 100 µS/cm or less.

11. The optical disc as claimed in claim 9, wherein the water absorption of the cured coating film is 1 to 7 wt %.

12. The optical disc as claimed in claim 9, wherein the cured coating film is a cured coating film containing a cured product of a polyfunctional (meth)acrylate having two or more (meth)acryloyl groups.

13. The optical disc as claimed in claim 9, 11, or 12, wherein the water in which the cured coating film has been immersed has a specific conductivity of 50 µS/cm or less.

14. The optical disc as claimed in claim 9, 11, or 12, wherein the combination of different kinds of material is a combination of a metal composed mainly of aluminum and gold.

15. The optical disc as claimed in claim 9, 11, or 12, wherein the combination of different kinds of material is a combination of a metal composed mainly of aluminum and a silicon based inorganic compound.

16. A method for producing an optical disc, comprising providing an ultraviolet curable composition containing an ultraviolet curable compound and a photopolymerization initiator, such that water in which an ultraviolet transmitting cured coating film has been immersed has a specific conductivity of 100 µS/cm or less, between thin films on two substrates comprising information recording layers, on each outermost layer of which the thin film of different type of material is formed; arranging the thin films to oppose each other; bonding them to each other; and then irradiating ultraviolet light to the composition through either one of or both of the thin films to convert the composition into a cured coating film to integrate both substrates with each other.

17. The production method as claimed in claim 16, wherein as the ultraviolet curable compound is used a polyfunctional (meth)acrylate having two or more (meth)acryloyl groups.

18. The production method as claimed in claim 16 or 17, wherein the ultraviolet irradiation is by continuous light irradiation.

19. The production method as claimed in claim 16 or 17, wherein the ultraviolet irradiation is by flash irradiation.

20. A method for producing an optical disc, comprising providing an ultraviolet curable composition containing an ultraviolet curable compound and a photopolymerization initiator, such that water in which an ultraviolet transmitting cured coating film has been immersed has a specific conductivity of 100 µS/cm or less, on at least one or both of thin films each of which is formed on one of two substrates comprising information recording layers, on each outermost layer of which the thin film of different type of material is formed; irradiating ultraviolet light onto the composition to provide a protective coat layer composed of a cured coating film of the ultraviolet curable composition; then providing an ultraviolet curable composition containing an ultraviolet curable compound and a photopolymerization initiator between the protective coat layer of one substrate and the thin film of the other substrate opposing each other, or between the protective coat layers of both substrates opposing each other; bonding them together; and irradiating ultraviolet light through either one of or both of the thin films to convert the composition into a cured coating film to integrate both substrates with each other.

21. The method for producing an optical disc, comprising bonding two optical discs produced as claimed in claim 16 or 20 such that the one of the thin films in the respective discs having a higher ultraviolet transmittance is arranged on the outer side.

* * * * *